United States Patent [19]

Dudley

[11] Patent Number: 4,837,075

[45] Date of Patent: Jun. 6, 1989

[54] COEXTRUDED PLASTIC FILM LABEL FOR IN-MOLD LABELING

[75] Inventor: Carol A. Dudley, Heath, Ohio

[73] Assignee: The Dow Chemical Company, Midland, Mich.

[21] Appl. No.: 49,035

[22] Filed: May 11, 1987

Related U.S. Application Data

[63] Continuation-in-part of Ser. No. 885,119, Jul. 14, 1986, abandoned.

[51] Int. Cl.$^4$ .................... B32B 27/00; C09J 7/02; B44C 00/00
[52] U.S. Cl. .................................. 428/220; 428/516; 428/349; 156/240
[58] Field of Search ............... 428/346, 347, 349, 220, 428/516; 156/239, 240

[56] References Cited

U.S. PATENT DOCUMENTS

| | | | |
|---|---|---|---|
| 3,271,225 | 9/1966 | Wolf | 156/82 |
| 4,101,701 | 7/1978 | Gordon | 428/483 X |
| 4,337,284 | 6/1982 | Cooper et al. | 428/349 X |
| 4,380,567 | 4/1983 | Shigemoto | 428/347 X |
| 4,426,422 | 1/1984 | Daniels | 428/347 X |
| 4,548,857 | 10/1985 | Galante | 428/349 X |
| 4,551,380 | 11/1985 | Schoenberg | 428/347 X |
| 4,565,720 | 1/1986 | Yaeo et al. | 428/349 X |
| 4,587,158 | 5/1986 | Ewing | 428/219 |
| 4,617,241 | 10/1986 | Muellor | 428/349 X |
| 4,684,554 | 8/1987 | Ou-Yang | 428/347 X |
| 4,704,310 | 11/1987 | Tighe et al. | 428/349 X |

Primary Examiner—George F. Lesmes
Assistant Examiner—M. A. Katz
Attorney, Agent, or Firm—Douglas N. Deline

[57] ABSTRACT

A label particularly adapted for use in in-mold labeling of blow-molded polyethylene containers comprising a heat activatable ethylene polymer adhesive layer and a surface printable layer with optional intermediate layers to provide interlayer adhesion and recycle of reground labels.

9 Claims, No Drawings

COEXTRUDED PLASTIC FILM LABEL FOR IN-MOLD LABELING

This is a continuation-in-part of application Ser. No. 885,119 filed July 14, 1986 now abandoned.

BACKGROUND OF THE INVENTION

The present invention relates to labels, especially to labels that are particularly adapted for use in in-mold labeling of blow-mold polyethylene containers. More particularly, the present invention relates to a coextruded plastic film label for use in such in-mold labeling applications.

The in-mold labeling of blow-mold polyethylene containers, particularly blow molded high density polyethylene containers allows the manufacturer to readily and inexpensively produce labeled containers directly from the molding operation without the need to apply adhesively backed labels in a subsequent step. By eliminating subsequent handling and adhesive applying operations capital investment and handling costs are substantially reduced. However, in-mold labeling equipment requires the cooperation of various mechanical devices which operate at relatively high speeds. Labels are supplied from a magazine and individually positioned by a mechanical or vacuum operated device inside of a mold which is thereafter closed and the molded thermoplastic object prepared. Blow molding is a suitable molding process wherein a parison of heat plastified thermoplastic resin, most generally high density polyethylene, is extruded and then expanded to conform to the inner surface of a mold. The label, which also must conform to the inner surface of the mold, must be held in place until contacted with the heat plastified thermoplastic resin and thereafter must become attached to the resulting object by means of a heat activated adhesive contained on the surface of the label.

The entire procedure must be carried out in a continuous and rapid manner. The supply of labels from a suitable magazine, the positioning of the label within the mold, and the blow molding procedure must proceed in an uninterrupted manner in order to attain desired economical level of operation. Accordingly, labels for use in in-mold labeling processes are required to meet demanding performance requirements. Suitably, the labels must be sufficiently stiff that wrinkling or folding does not occur during handling by the automated equipment. Contrarywise, the labels are required to be sufficiently elastic or flexible that upon attachment to the desired blow molded object they will remain adhered thereto without splitting or separating despite bending, flexing, or squeezing of the finished container.

For certain applications the container, especially shampoos containers, laundry detergent containers, etc. may be exposed to high humidity or water. The adhesive used to adhere the label to such a container should desirably resist the effects of moisture which may lead to delamination or wrinkling of the label.

A further requirement of in-mold labels is the presence of a suitable surface appearance. It is highly desirable from an esthetical and consumer acceptance point of view that the label not affect graphics or printing appearing on the surface thereof. Because thermoplastic scrap generated in the manufacture of coextruded films is desirably reused by recycling, i.e., regrinding and remelting, and incorporating the same into a separate inner layer of the film, it is highly desirable in the preparation of such labels that such scrap containing layer within the label not affect surface qualities of the label itself.

Finally, previously known in-mold labels prepared from cellulosic base stocks, such as paper, have proven undesirable in operation because the recycle of scrap blow-molded objects having such labels affixed thereto requires tedius mechanical means or solvents to first remove the labels. In order to reclaim or recycle such bottles, particularly defective bottles prepared during the blow-molding process, it is first necessary to remove the paper labels. Contamination by residual adhesive and small portions of unremoved paper may make it practically impossible to reclaim defective blow-molded containers bearing such labels. As an alternate means of disposal, defective containers must be burned or buried in landfills both of which practices are wasteful and undesirable.

It would be desirable to provide a polymeric label particularly adapted for use in in-mold labeling of blow-molded polyethylene containers.

In addition, it would be desirable to provide such a label for use in in-mold labeling which combines suitable properties of modulus of elasticity and flexibility, and at the same is adaptable to in-mold processing conditions and not degraded by flexing and handling of the subsequent container.

It would further be desirable to provide a label for use in in-mold labeling applications which is unaffected by moisture or high humidity environments.

Finally, it would be desirable to provide a label for in-mold labeling operations which does not have to be removed from such containers in order to recycle or regrind defective thermoplastic containers for subsequent incorporation into the thermoplastic.

SUMMARY OF THE INVENTION

According to the present invention there is now provided an adhesive label particularly adapted for use in the in-mold labeing of blow molded polyethylene containers comprising: (1) a heat activatable adhesive substrate layer of a polymer selected from the group consisting of (a) homopolymers of ethylene (b) copolymers of ethylene with one or more $\alpha$-olefins having from 4 to 8 carbons (c) mixtures of (a) and (b) and (d) mixtures of either (a), (b) or (c) with up to about 95, preferably up to about 50 percent by weight of a copolymer of ethylene and from about 1 percent to about 30 percent by weight of a copolymerizable ethylenically unsaturated carboxylic acid or ester containing comonomer; (2) when the heat activatable adhesive substrate layer comprises (a), (b) or (c) an interlayer of a copolymer of ethylene and from about 1 percent to about 30 percent by weight of a copolymerizable ethylenically unsaturated carboxylic acid or ester containing comonomer; and (3) a surface printable layer comprising polystyrene.

The label desirably has a 1 percent secant modulus, measured according to Americal Society of Testing Methods (ASTM) test D-882, of from about 15,000 to about 600,000 lbs/in$^2$ ($1.034 \times 10^9$ to $4.136 \times 10^9$ Pa) and a thickness of from about 0.001 to about 0.010 inch (0.025 to about 0.25 mm).

DETAILED DESCRIPTION OF THE INVENTION

In one embodiment of the invention, the heat activatable adhesive substrate layer of the present invention desirably comprises a polyethylene polymer. Suitable polyethylene polymers include high density polyethylene, low density polyethylene, linear low density polyethylene and blends thereof. In this embodiment, it is desirable to insert an interlayer between the adhesive substrate layer and the surface printable layer in order to obtain suitable adhesion therebetween. In this case, the interlayer comprises a copolymer of ethylene and from about 1 percent to about 30 percent by weight of a copolymerizable ethylenically unsaturated carboxylic acid or ester containing comonomer. Preferred copolymers contain from about 5 percent to about 25 percent of the copolymerizable ethylenically unsaturated carboxylic acid or ester containing comonomer.

As previously mentioned, the heat activatable adhesive substrate may also comprise the aforementioned polyethylene polymer blended with up to about 95 preferably up to about 50 percent by weight of a copolymer of ethylene and from about 1 percent to about 30 percent by weight of a copolymerizable ethylenically unsaturated carboxylic acid or ester containing comonomer. In such an embodiment, the interlayer adhered between the adhesive substrate and the surface printable substrate may be eliminated. When amounts of carboxylic acid or ester containing comonomer greater than about 95% are employed, difficulty in film preparation and handling may be encountered.

Copolymerizable ethylenically unsaturated carboxylic acid or ester containing comonomers for use herein include ethylenically unsaturated carboxylic acids and esters thereof having up to about 12 carbons. Examples include acrylic acid, methacrylic acid, methylmethacrylate, butyl acrylate, vinyl acetate, etc. A preferred ethylenically unsaturated carboxylic acid or ester containing comonomer is vinyl acetate.

A preferred heat activatable adhesive substrate comprises a blend of from about 50 percent to about 75 percent of low density polyethylene and from about 50 percent to about 25 percent of a copolymer of ethylene and vinyl acetate, said copolymer containing from about 5 percent to about 25 percent vinyl acetate. A most preferred heat activatable adhesive substrate comprises from about 60 percent to about 70 percent low density polyethylene and from about 40 percent to about 30 percent ethylene/vinyl acetate copolymer.

The surface printable layer comprises polystyrene, and is adapted to receive printing ink, dyes, metal films, etc. and provide a smooth defect-free surface. Generally, pigment or fillers are provided in order to provide a suitable background for printing, and to hide refractive index changes in the other layers of the label or any blemishes or other defects appearing in the layer of reground and recycled polymer. A suitable surface printable layer comprises from about 75 percent to about 98 percent by weight of polystyrene and from about 25 percent to about 2 percent by weight of a suitable pigment, or filler. Examples of pigments include titanium dioxide, carbon black, etc. Suitable fillers include calcium carbonate, silica, talc, etc. A particularly preferred pigment is titanium dioxide.

It is furthermore desirable in operation, that the labels of the present invention additionally include a layer interposed between the adhesive substrate and the surface printable layer that comprises reground and recycled thermoplastic material employed to prepare such labels. Significant waste occurs in the manufacturing of films used to prepare labels both in the generation of defective films, and in cuttings and trimmings left over from sizing and die-cutting of the desired shaped films and labels. Unless such waste is able to be reground, remelted and included in the film stock, a significant economic loss is incurred. Accordingly, in a preferred embodiment of the present invention, a scrap and regrind layer is interposed between the heat activatable adhesive substrate layer and the surface printable layer. Where the resulting structure comprises four layers it is desirable that such regrind layer be placed adjacent to the surface printable layer. The regrind layer may comprise up to about 50 percent by weight of reground label material with the balance comprising pigments, fillers and polystyrene. Because the regrind layer may contain color bodies and have a marbled or swirled appearance the surface printable layer desirably contains sufficient pigment so as to hide or cover over such defects appearing in additional layers of the label.

Because the labels of the present invention are adhered to the polyethylene blow-molded container by melt adhesion of the heat activatable adhesive substrate an exceedingly strong adhesive bond is attained between the labels of the present invention and the blow-molded container. This bond is unaffected by the presence of water or high humidity which may cause delamination of adhesive applied in the form of dispersions, and is also unaffected by flexing or bending of the underlying blow-molded container.

In addition, the absence of a noncompatible adhesive coating is believed to aid in producing a compatible blend upon regrinding and remelting of scrap containers. More particularly defects such as swirls appearing in the regrind layer are reduced by eliminating such an adhesive coating.

In order to operate most smoothly in the in-mold labeling process, the label of the present invention preferably has a 1 percent secant modulus of from about 200,000 to about 400,000 pounds/in$^2$ ($1.378 \times 10^9$ to $2.758 \times 10^9$ Pa) and a thickness of from about 0.002 to about 0.005 inches (0.05 to 0.127 mm).

Generally, any of the various layers in the label of the present invention may comprise from about 10 percent to about 50 percent of the total label thickness.

The label of the invention may be prepared by any suitable technique such as laminating of the various layers. Preferably a label stock is prepared by coextrusion of the various label layers utilizing coextrusion techniques previously known in the art. Suitably, the resins to be used in the various layers are separately heat plastified and extruded through a multi-feedblock die in the form of a thin sheet or film. Alternatively, the extrusion is in the form of a tube which is later expanded by use of compressed air or an expansion mandrel to provide a thin film comprising the various layers according to the present invention. After cooling and slitting into a suitable width film, the labels are printed and die cut according to known techniques. Advantageously, because separately applied adhesive is not employed, the labels may be conveniently and economically prepared.

What is claimed is:

1. A polymeric adhesive label particularly adapted for use in the in-mold labeling of blow-molded polyethylene containers comprising: (1) a heat activatable adhesive substrate layer of a polymer selected from the group consisting of (a) homopolymers of ethylene (b) copolymers of ethylene with one or more α-olefins having from 4 to 8 carbons (c) mixtures of (a) and (b) and (d) mixtures of either (a), (b) or (c) with up to 50 percent by weight of a copolymer comprising ethylene and from about 1 percent to about 30 percent by weight of a copolymerizable ethylenically unsaturated carboxylic acid or ester containing comonomer; (2) when the heat activatable adhesive substrate layer comprises (a), (b) or (c) an interlayer of a copolymer of ethylene and from about 1 percent to about 30 percent by weight of a copolymerizable ethylenically unsaturated carboxylic acid or ester containing comonomer; and (3) a surface printable layer comprising polystyrene.

2. A label according to claim 1 having a 1 percent secant modulus of from about 150,000 to about 600,000 lbs/in$^2$ (1.034×10$^9$ Pa) and a thickness of from about 0.001 to about 0.010 inch (0.025 to about 0.25 mm).

3. A label according to claim 1 having a 1 percent secant modulus from about 200,000 to about 400,000 lb/in$^2$ (1.378×10$^9$ to 2.758×10$^9$ Pa).

4. A label according to claim 1 having a thickness from about 0.002 to about 0.005 inches (0.05 to about 0.127 mm).

5. A label according to claim 1, wherein the heat activatable adhesive substrate comprises low density polyethylene.

6. A label according to claim 1, wherein the carboxylic acid or ester containing comonomer is vinyl acetate.

7. A label according to claim 1 additionally containing a recycle layer of ground remelted label interposed between the heat activatable adhesive substrate and the surface printable layer.

8. A label according to claim 1, wherein the surface printable layer additionally comprises from about 30 percent to about 2 percent by weight of a pigment or filler.

9. A polymeric adhesive label particularly adapted for use in the in-mold labeling of blow-molded polyethylene containers comprising: (1) a heat activatable adhesive substrate layer of a polymer selected from the group consisting of (a) homopolymers of ethylene (b) copolymers of ethylene with one or more α-olefins having from 4 to 8 carbons (c) mixtures of (a) and (b) and (d) mixtures of either (a), (b) or (c) with up to 95 percent by weight of a copolymer comprising ethylene and from about 1 percent to about 30 percent by weight of a copolymerizable ethylenically unsaturated carboxylic acid or ester containing comonomer; (2) when the heat activatable adhesive substrate layer comprises (a), (b), or (c) and interlayer of a copolymer of ethylene and from about 1 percent to about 30 percent by weight of a copolymerizable ethylenically unsaturated carboxylic acid or ester containing comonomer, and (3) a surface printable layer comprising polystyrene.

* * * * *

UNITED STATES PATENT AND TRADEMARK OFFICE
CERTIFICATE OF CORRECTION

PATENT NO. : 4,837,075
DATED : June 6, 1989
INVENTOR(S) : Carol A. Dudley

It is certified that error appears in the above-identified patent and that said Letters Patent is hereby corrected as shown below:

Col. 1, line 55, "shampoos" should correctly appear as --shampoo--.

Col. 2, line 40, "labeing" should correctly appear as --labeling--.

Col. 2, line 60, "15,000" should correctly appear as --150,000--.

Col. 5, line 12, "1.034 X $10^9$PA)" should correctly appear as --(1.034 X $10^9$ to 4.136 X $10^9$PA)--.

Signed and Sealed this

Fifth Day of June, 1990

Attest:

HARRY F. MANBECK, JR.

Attesting Officer

Commissioner of Patents and Trademarks